Sept. 15, 1931.  A. L. BAUSMAN  1,823,483
TRANSFER DEVICE
Original Filed June 10, 1929  2 Sheets-Sheet 2
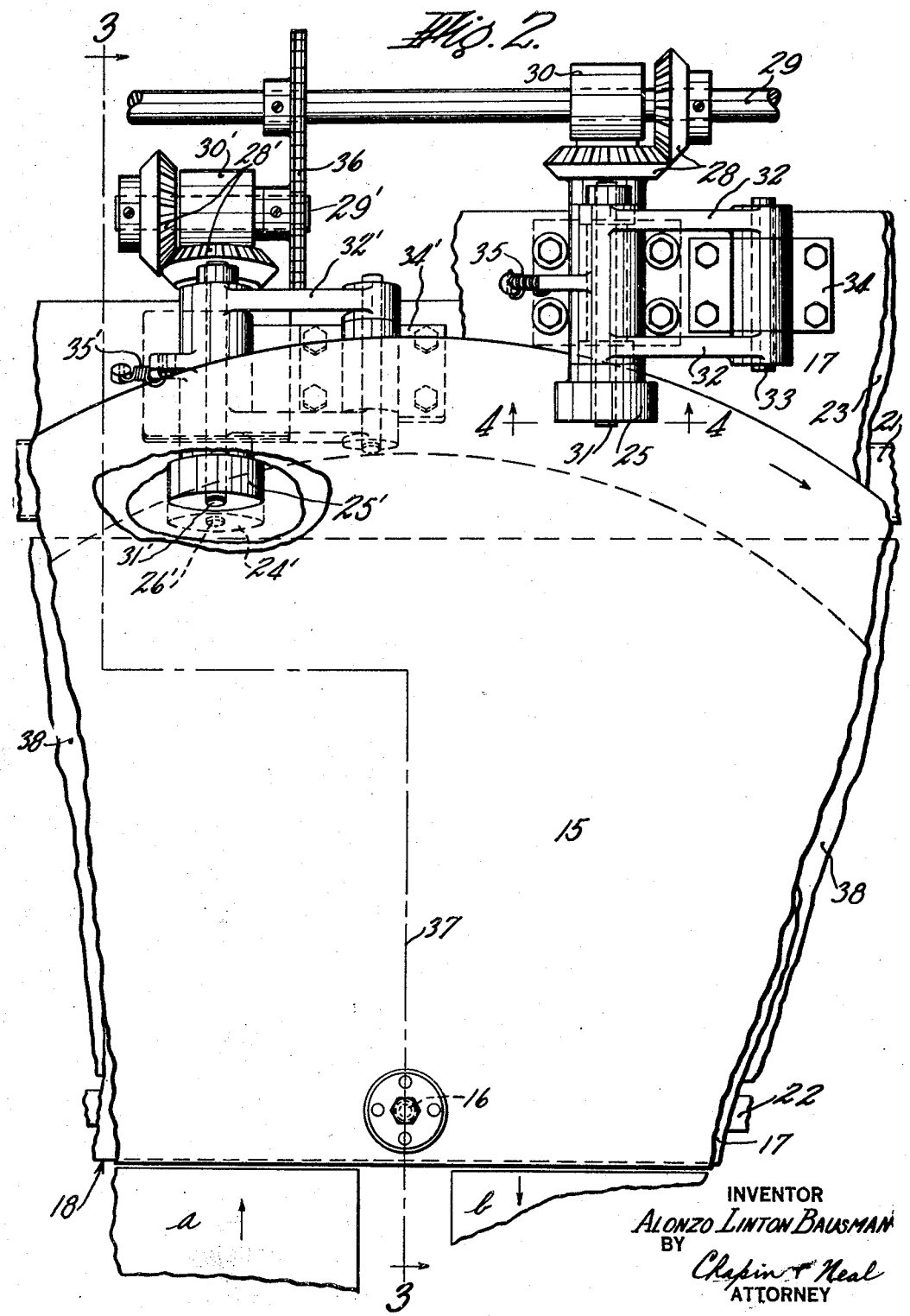
INVENTOR
ALONZO LINTON BAUSMAN
BY Chapin + Neal
ATTORNEY Patented Sept. 15, 1931

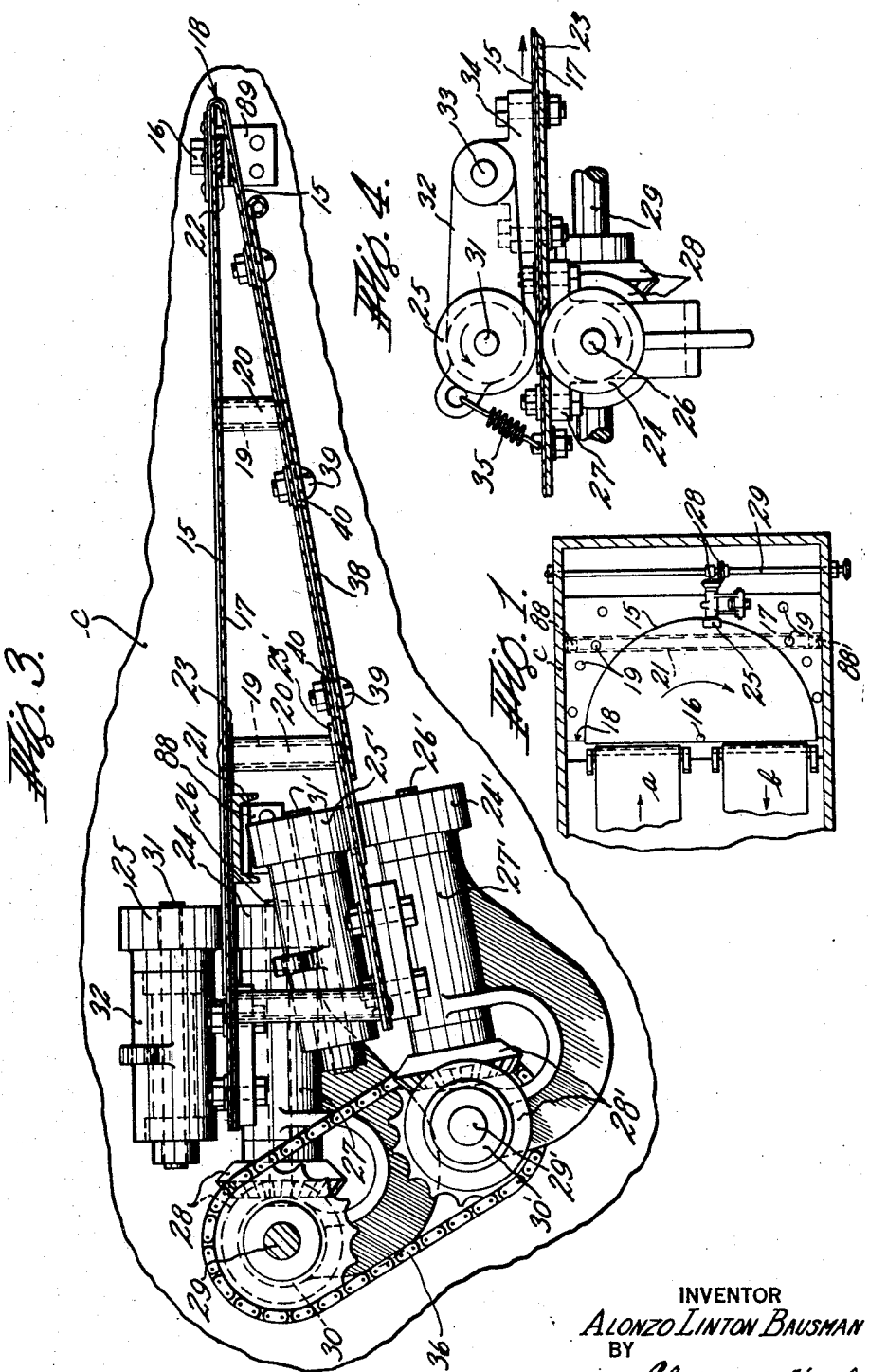

1,823,483

UNITED STATES PATENT OFFICE

ALONZO LINTON BAUSMAN, OF SPRINGFIELD, MASSACHUSETTS

TRANSFER DEVICE

Original application filed June 10, 1929, Serial No. 369,710. Divided and this application filed April 8, 1930. Serial No. 442,566.

This invention relates to improvements in transfer devices of the type enabling articles to be transferred from one to the other of two oppositely moving conveyers.

The invention is a division of that disclosed in my copending application Serial No. 369,710, filed June 10, 1929.

The general object of this invention is to provide a transfer device which is suitable for use in handling confections or the like and which will effect the transfer without requiring the confections to drop, bump or slide during the transfer.

Other objects and advantages will appear as the detailed description proceeds and will be particularly pointed out in the appended claims.

The invention will be disclosed with reference to the accompanying drawings, in which:—

Fig. 1 is a small scale sectional plan view of part of a cold box showing one way in which the transfer device is used and one way in which it may be mounted;

Fig. 2 is a fragmentary top plan view of the transfer device; and

Figs. 3 and 4 are sectional views taken on the lines 3—3 and 4—4, respectively, of Fig. 2.

Referring to these drawings; the invention features a transfer device, which receives articles carried by a belt conveyer and transfers them to another belt conveyer without dropping them and in such a manner that the articles on the second conveyer are in the same orderly arrangement that existed on the first conveyer. This transfer device also reverses the direction of travel of the articles in that it is designed to carry them in semi-circular paths and in a horizontal plane, or one which is sufficiently close to the horizontal so that the articles will not fall off the device or out of place thereon. The device, thus, is adapted for transferring goods from one of two oppositely moving and adjacent conveyers to the other,—the receiving end of one and the delivery end of the other being in substantially the same plane and in the plane of the transfer device.

Referring to Fig. 1, the transfer device comprises a circular sheet 15 of any suitable flexible material. This sheet is pivoted at 16 to a fixed plate 17, on the upper face of which a little more than half the sheets is supported,—the remainder of the sheet being disposed below the plate, as will be clear from Figs. 2 and 3. One edge 18 of this plate, about which the sheet bends in passing from its upper to its lower stretch of travel, is straight and parallel to a diameter of the sheet and as closely adjacent thereto as is feasible. The sheet is turned about the vertical axis 16 by power applied adjacent its outer periphery, and in such a manner that an outward radial pull as well as a tangential pull is imparted to the sheet. Preferably, both upper and lower stretches of the circular sheet 15 are so driven. Only substantially half of the rotating sheet 15 is utilized at any one time. Conveyers $a$ and $b$ having oppositely moving stretches are arranged in parallel and adjacent relation on opposite sides of the axis 16 and with the delivery end of one and the receiving end of the other in close proximity to the edge 18, as indicated in Fig. 2. The result is that articles pass off the delivery end of one conveyer onto the upper half of the sheet 15 and are conveyed by the latter in semi-circular paths and finally transferred to the receiving end of the other conveyer. The articles will have the same arrangement on the second conveyer that they had on the first and the transfer will be effected without any dropping of the articles. Both these features are important where the articles are confections.

Referring now to Figs. 2 to 4, the plate 17 is simply a rectangular piece of sheet metal bent along the line 18 so that the one portion underlies the other and is disposed at an acute angle therewith. This gives a nice round to the edge 18. The two sections of plate 17 are rigidly tied together and held in the desired spaced relation in any suitable way, as by a series of rivets 19, passing through spacing sleeves 20,—such rivets being located beyond the periphery of sheet 15 as shown in Fig. 1. The upper section of plate 17 is supported in any suitable manner, as by a channel iron 21 and a cross bar 22, the ends of which are fixed to any suitable support, such as the side walls of the cold box *c* shown in Fig. 1. Reenforcing plates 23 and 23' are secured to the upper and lower sections, respectively, of plate 17 at the point on each where the driving mechanism is located. The same driving mechanism is used for both the upper and lower course of travel of sheet 15 and one only will be described, corresponding parts of the other being given the same reference numerals with the addition of a prime. The driving mechanism includes a pair of coacting rolls 24 and 25 which grip between them the sheet 15,—the plates 17 and 23 being suitably recessed to allow the lower roll to engage the sheet (Fig. 4). The lower roll is positively driven, being fixed to one end of a shaft 26, mounted in a bracket 27, secured to the under face of plate 23. Such shaft is driven by bevel gearing 28 from a drive shaft 29, which as shown in Fig. 1, extends across the cold box *c* and is rotatably supported at its ends therefrom. The bracket 27 has an extension 30 which serves as an intermediate bearing for shaft 29. The upper roll 25 is an idler which is carried on a shaft 31 mounted in the free end of an arm 32, pivoted on a shaft 33, carried by a bracket 34, secured to the upper face of plate 17. A spring 35 forces roll 25 against sheet 15 and the latter against the underlying roll 24. The shaft 29 drives by a chain 36 and suitable sprockets, the shaft 29' of the lower driving mechanism at the same speed and in the same direction. The shafts 26 and 26', however, turn in opposite directions because the driving bevel gear 28' engages its driven gear from the opposite side from that in which the driving gear 28 engages its driven gear.

It is to be noted that the axes of the driving rolls are not parallel to the respective radial lines of sheet 15 which pass through the respective points of contact of such rolls with the sheet 15. As a result, the force imparted by the rolls to the sheet 15 may be resolved into a driving component in a tangential direction, and a stretching component in an outward radial direction. The sheet 15 is thus stretched as it is driven. The lower set of rolls are offset from the center line 37 on the opposite side from that on which the upper set of rolls are offset and by an equal amount. By so doing, the sheet, in both stretches is kept taut and smooth. The two stretching components preferably act on the sheet at diametrically opposed points as shown. For the best results, as far as keeping the sheets 15 from wrinkling is concerned, the driving rolls should be offset from the center line 37 in the direction in which the sheet is driven.

Preferably, means are provided to support the sheet 15 in its lower course of travel. Such means may conveniently take the form of a plate 38 underlying the lower section of plate 17 and secured near its ends to such section, as by bolts 39, which pass through spacing sleeves 40, inserted between plate 38 and such section.

The above described transfer device, while a complete invention in itself, capable of general use, also enables the use of certain advantageous arrangements of conveyers which are particularly important in connection with candy making machinery. This is particularly so with respect to the delivery conveying system of a candy making machine, where the requirement is to convey the freshly made candies until they have set sufficiently to enable them to be handled and packed. Usually, such delivery system includes a single conveyer which carries the candies through a so-called cold box in which the candies are artificially cooled. In such case, the conveyer and cold box often need to be exceedingly long and an objectionable amount of floor space is required. By the use of one or more of my transfer devices and a plurality of conveyers, the candies may be carried back and forth in the cold box, indicated in part at *c* in Fig. 1, and the cold box can be substantially reduced in length.

In operation, it may be assumed that confections, such as freshly coated candies, are carried on the upper stretch of conveyer *a*. These are carried through the cold box *c* for a sufficient time so that the coatings have set to an extent to enable them to be safely transferred by the time they reach the transfer device. Conveyer *a* would be of suitable material or have a confection supporting surface such that the candies can be readily loosened therefrom after the coatings have set. As conveyer *a* reaches the end of its upper stretch of travel and turns to enter its return stretch of travel, the bending of the conveyer will strip the candies free of the belt. The candies pass onto the transfer device without dropping and are transferred by such device to conveyer *b* without dropping or bumping them. The transfer device is thus especially suitable for use with candies which are easily injured and need to be carefully handled. Also, the transfer device effects the transfer without in any way destroying the orderly arrangement of the candies.

The invention has been disclosed herein in an embodiment at present preferred and with detailed variations, for the purposes of illustration. The invention may, however, be practiced in many ways differing specifically from those herein disclosed and it is the intention not to limit the invention to the features disclosed except in so far as the same are pointed out in the appended claims.

What I claim is:

1. A transfer device, comprising, a support presenting a plane upper face and having a straight edge, a rotatable member of flexible material folded about said edge and supported substantially half on said upper face and substantially half below said face said member revolving about an axis which is normal to said face and close to and intermediate the ends of said edge.

2. A transfer device, comprising, a support affording a straight edge, a rotatable sheet of flexible material folded about said edge and supported substantially half on the upper face of said support and substantially half below the same, said sheet being pivoted at its center to said support at a point closely adjacent said edge, and means for driving said sheet at points located adjacent the periphery of its upper portion.

3. A transfer device, comprising, a support affording a straight edge, a rotatable sheet of flexible material folded about said edge and supported substantially half on the upper face of said support and substantially half below the same, said sheet being pivoted at its center to said support at a point closely adjacent said edge, and means located adjacent the periphery of the upper portion of said sheet for imparting a tangentially directed driving force and a radially outwardly directed stretching force to said portion.

4. A transfer device, comprising, a support having a straight edge, a rotatable sheet centrally pivoted to said support at a point closely adjacent to and intermediate the ends of said edge, said sheet being folded over said edge along a line parallel to and closely adjacent a diameter of the sheet with substantially half the sheet resting on the upper face of said support and the remainder below the same, and pairs of coacting rolls for gripping between them and driving the upper and lower portions of said sheet.

5. A transfer device, comprising, a support having a straight edge, a rotatable sheet centrally pivoted to said support at a point closely adjacent to and intermediate the ends of said edge, said sheet being folded over said edge along a line parallel to and closely adjacent a diameter of the sheet with substantially half the sheet resting on the upper face of said support and the remainder below the same, and pairs of coacting rolls for gripping between them and driving the upper and lower portions of said sheet, the axes of each pair of said rolls being oblique with reference to the radial line of said sheet which intersects the line of contact of said rolls therewith.

6. A transfer device, comprising, an upper support having a straight edge, a lower support, a rotatable sheet centrally pivoted to said upper support at a point closely adjacent to and intermediate the ends of said edge, said sheet being folded over said edge along a line parallel to and closely adjacent a diameter of the sheet with substantially half the sheet resting on the upper support and the remainder against the lower support, and pairs of coacting rolls for gripping between them and driving the upper and lower portions of said sheet, the upper and lower pairs of coacting rolls being offset on opposite sides of the radial line of said sheet which lies normal to said edge.

7. A transfer device, comprising an upper support having a straight edge, a lower support, a rotatable sheet centrally pivoted to said upper support at a point closely adjacent to and intermediate the ends of said edge, said sheet being folded over said edge along a line parallel to and closely adjacent a diameter of the sheet with substantially half the sheet resting on the upper support and the remainder against the lower support, and pairs of coacting rolls for gripping between them and driving the upper and lower portions of said sheet, the axes of each pair of said rolls being oblique with reference to the radial line of said sheet which intersects the line of contact of said rolls therewith, the upper and lower pairs of coacting rolls being offset on opposite sides of the radial line of said sheet which lies normal to said edge.

8. A transfer device, comprising, an upper support having a straight edge, a lower support, a rotatable sheet centrally pivoted to said upper support at a point closely adjacent to and intermediate the ends of said edge, said sheet being folded over said edge along a line parallel to and closely adjacent a diameter of the sheet with substantially half the sheet resting on the upper support and the remainder against the lower support, and pairs of coacting rolls for gripping between them and driving the upper and lower portions of said sheet, the upper and lower pairs of coacting rolls being offset from the radial line of said sheet which lies normal to said edge and in the direction of travel of that portion of the sheet driven thereby.

9. A transfer device, comprising a support presenting upper and lower faces which converge toward and are joined by a rounded edge, such edge being transversely straight, a rotatable sheet of flexible material folded about said edge and supported substantially half on one face and half on the other face of said support and pivoted at its center thereto at a point closely adjacent said edge, and means for driving the upper and the lower portions of said sheet at points near its peripheral edge.

10. In combination, a pair of belt conveyers mounted to travel side by side with their upper stretches moving in opposite directions, and a rotatable flexible member supported and guided so that substantially half of its travel is in the same plane as the receiving end of one of said conveyers and the delivery end of the other conveyer and located with respect to said ends so as to receive articles carried by the upper stretch of one conveyer and convey them in semi-circular paths to the upper stretch of the other conveyer, the remainder of the travel of said member being supported and guided in another plane out of the path of said conveyers.

11. In combination, a pair of conveyers mounted to travel side by side and in opposite directions, a stationary support having a straight edge mounted in closely adjacent relation to the delivery end of one conveyer and the receiving end of the other conveyer and in the same plane as said conveyers, a flexible member folded about said edge and supported substantially half on the upper and half on the lower face of said support, and means for turning said member about an axis located closely adjacent said edge and intermediate the ends thereof and intermediate said conveyers.

In testimony whereof I have affixed my signature.

ALONZO LINTON BAUSMAN.